(12) United States Patent
Smith et al.

(10) Patent No.: US 7,973,652 B1
(45) Date of Patent: Jul. 5, 2011

(54) PERSONAL SAFETY SYSTEM FOR A VEHICLE

(75) Inventors: Douglas Smith, Knoxville, TN (US); Mike Moore, Charlotte, NC (US); Paul Ray Martin, Norris, TN (US)

(73) Assignee: Geared-Up Technologies, LLC, Weddington, NC (US)

( * ) Notice: Subject to any disclaimer, the term of this patent is extended or adjusted under 35 U.S.C. 154(b) by 901 days.

(21) Appl. No.: 11/985,384

(22) Filed: Nov. 15, 2007

(51) Int. Cl.
*B62J 3/00* (2006.01)
*A42B 7/00* (2006.01)

(52) U.S. Cl. .............................. 340/432; 340/479; 2/421

(58) Field of Classification Search .................. 340/432, 340/457, 464, 468, 479, 425.5; 2/410, 421, 2/422, 424, 425, 918; 180/219; 307/9.1
See application file for complete search history.

(56) References Cited

U.S. PATENT DOCUMENTS

| | | | | |
|---|---|---|---|---|
| 5,294,914 | A | * | 3/1994 | Dallas ........................... 340/432 |
| 6,003,156 | A | | 12/1999 | Anderson |
| 6,784,795 | B1 | * | 8/2004 | Pories et al. ................... 340/479 |
| 2009/0002161 | A1 | * | 1/2009 | Luciani ....................... 340/568.6 |

OTHER PUBLICATIONS

Safe Kids Worldwide; Safe Kids U.S. Summer Safety Ranking Report; pp. 1-30; published prior to May 2007.
Electromechanical Actuators Sixth Eidtion; Latching Solenoids Also Known as Bi-Stable, Keep, Remanence, or Self-Holding Solenoid; pp. 15-40; published prior to Nov. 2007.
Chipcon; User Manual Rev. 2.01 SmartPF CC1010DK Development Kit; www.chipcon.com; pp. 1-40; published prior to Feb. 2003.

* cited by examiner

*Primary Examiner* — Van T. Trieu
(74) *Attorney, Agent, or Firm* — Schwartz Law Firm, P.C.

(57) ABSTRACT

A personal safety system is designed for a user of a vehicle. The system includes body-protective gear adapted for wear by the user of the vehicle. A sensor determines a positive or negative functional state of the body-protective gear. In the positive functional state, the body-protective gear is presumed to be properly applied to a body part of the user; and in the negative functional state, the body-protective gear is presumed to be improperly applied to the body part of the user. A transceiver is operatively connected to the sensor, and communicates the functional state of the body-protective gear to the vehicle. When the body-protective gear is in the negative functional state, operation of the vehicle is restricted.

17 Claims, 9 Drawing Sheets

PERSONAL SAFETY SYSTEM FOR A VEHICLE

TECHNICAL FIELD AND BACKGROUND

The present disclosure relates broadly to a personal safety system for vehicles. In one exemplary embodiment, the safety system comprises body-protective gear, such as a bicycle helmet, and means for restricting operation of a pedal-propelled bicycle in the event the helmet is not used, or is improperly applied to the head and/or inadequately secured.

According to a study published in the OFFICIAL JOURNAL OF THE AMERICAN ACADEMY OF PEDIATRICS (PEDIATRICS Vol. 112 No. 2 Aug. 2003, pp. 320-323), ninety-six percent of children and adolescents wore helmets in inadequate condition and/or with inadequate fit. This occurred despite a high acceptance of helmet use by this population. Other medical studies suggest that a high percentage of cyclists' brain injuries can be prevented by a properly worn helmet—estimated at anywhere from 45 to 88 percent. About 540,000 bicyclists visit emergency rooms with injuries every year; and of these, 784 died on US roads in 2005.

Many years of potential life are lost because about half of the deaths are children under 15 years of age. Direct costs of cyclists' injuries due to not using helmets are estimated at $81 million each year, while indirect costs are estimated at $2.3 billion each year.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," or the like, do not necessarily refer to the same embodiment, although they may.

According to one exemplary embodiment, the invention comprises a personal safety system designed for a user of vehicle. The system includes body-protective gear adapted for wear by the user of the vehicle. The term "body-protective gear" refers broadly to any safety device, padding, equipment, straps, covering or the like designed to be worn by or used on (either directly or indirectly) a body part of the user. Examples of body-protective gear include safety helmets, arm guards, leg guards, chest pads, personal floatation devices, protective eye wear, ear plugs, safety straps and harness, and the like. Means are provided for determining a positive or negative functional state of the body-protective gear. In the positive functional state, the body-protective gear is presumed to be properly applied to a body part of the user; and in the negative functional state, the body-protective gear is presumed to be improperly applied to the body part of the user. Means are provided for communicating the functional state of the body-protective gear to the vehicle. Means are provided for restricting operation of the vehicle when the body-protective gear is in the negative functional state.

According to another exemplary embodiment, the means for determining a functional state of the body-protective gear includes an electric circuit with contacts located on the body-protective gear. The means may comprise any suitable sensor applicable for determining the functional state of the body-protective gear (i.e., whether the gear is applied to the body part of the user).

According to another exemplary embodiment, the means for communicating the functional state of the body-protective gear includes a transceiver carried by the body-protective gear. The communication means may comprises any suitable wireless (or wired) communication device.

According to another exemplary embodiment, the means for restricting operation of the vehicle includes a rotation-control hub assembly adapted for attachment to a wheel of the vehicle.

According to another exemplary embodiment, the hub assembly includes a movable locking pin adapted for selectively locking the wheel of the vehicle against rotational movement. The term "selectively" means that the pin only locks the wheel under predetermined conditions.

According to another exemplary embodiment, the hub assembly includes means for actuating the locking pin between a wheel-releasing position and a wheel-locking position.

According to another exemplary embodiment, the means for actuating the locking pin comprises a solenoid.

According to another exemplary embodiment, means are provided for sensing rotational movement of the vehicle wheel. The sensing means communicates with the solenoid to block actuation of the locking pin upon rotational movement of the vehicle wheel.

According to another exemplary embodiment, the vehicle is a manually-propelled bicycle. Other examples of vehicles which may incorporate the present safety system include scooters, inline skates, roller skates, skate boards, jet skies and other water craft, ATV's, golf carts, motorcycles, mopeds, electric toy vehicles, and the like.

According to another exemplary embodiment, the body-protective gear includes a safety helmet having first and second attachment straps. The attachment straps have cooperating male and female buckles located at respective free ends, and adapted for releasably mating to buckle the attachment straps.

According to another exemplary embodiment, the means for determining a functional state of the body-protective gear includes an electric circuit with contacts located on the male and female buckles of the attachment straps, and adapted for closing upon insertion of the male buckle into the female buckle.

According to another exemplary embodiment, the means for determining a functional state of the body-protective gear includes an electric circuit with contacts located on an interior of the helmet, and adapted for closing in the positive functional state of the helmet on the head of the user.

According to another exemplary embodiment, the means for communicating the functional state of the body-protective gear comprises a transceiver carried by the body-protective gear.

In yet another embodiment, the invention comprises a method for restricting operation of a vehicle. The method includes determining a positive or negative functional state of body-protective gear worn by a user of the vehicle. In the positive functional state, the body-protective gear is presumed to be properly applied to a body part of the user; and in the negative functional state, the body-protective gear is presumed to be improperly applied to the body part of the user.

The functional state of the body-protective gear is then communicated to the vehicle. Operation of the vehicle is then restricted when the body-protective gear is in the negative functional state.

BRIEF DESCRIPTION OF THE DRAWINGS

The description of exemplary embodiments proceeds in conjunction with the following drawings, in which.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at lease one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

Figure 1:
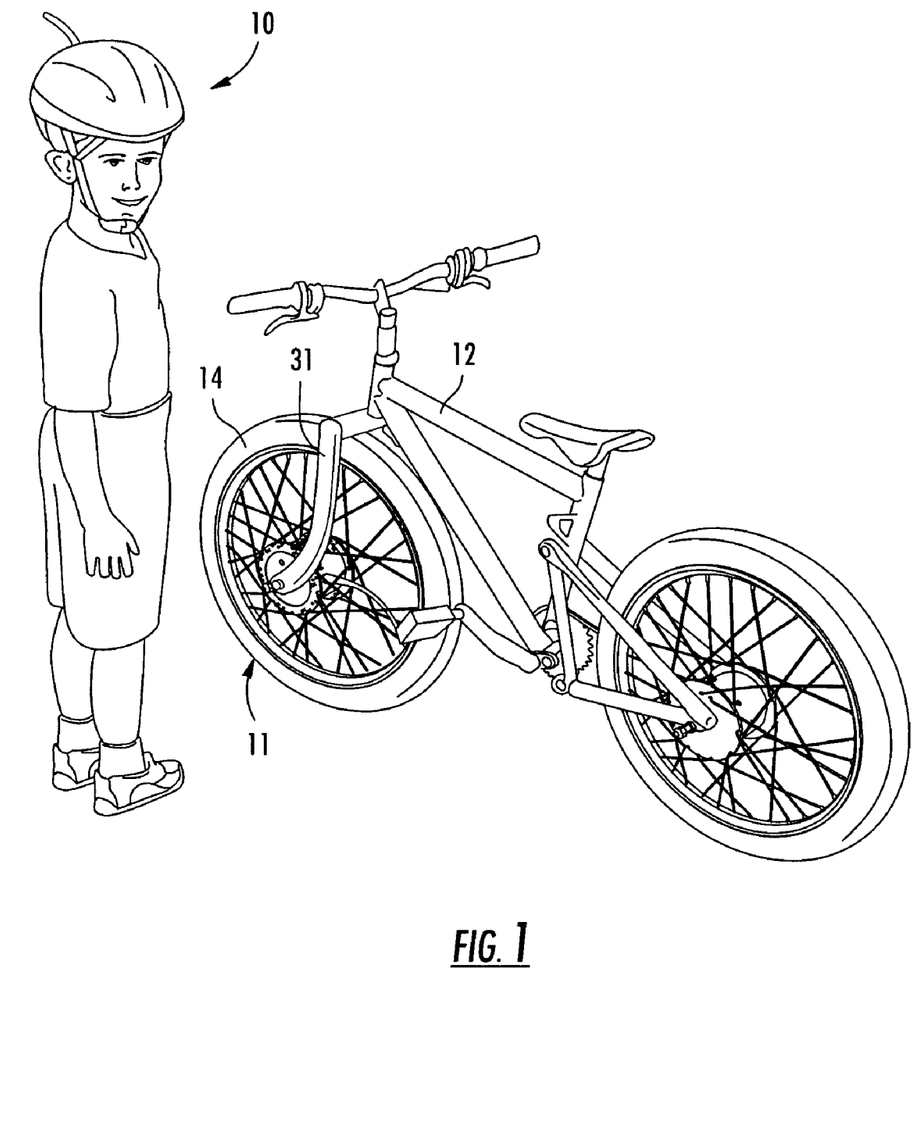
FIG. 1 is an environmental view of an exemplary safety system of the present invention comprising a safety helmet and wheel rotation-control hub assembly.

Referring now specifically to the drawings, principal components of a personal safety system according to one exemplary embodiment of the present invention are illustrated in FIG. 1 and shown generally at reference numerals 10 and 11, respectively. The personal safety system is applicable for protecting users of vehicles, such as the manually (pedal)-propelled bicycle 12, against injury in the event of a crash or fall. In this exemplary embodiment, the safety component 10 comprises a safety helmet designed to fit the head of the user, while the safety component 11 comprises a rotation-control hub assembly located on a front wheel 14 of the bicycle 12. As discussed in further detail below, the safety helmet 10 incorporates electronics which communicate with the bicycle hub assembly 11 to signal a positive or negative functional state of the safety helmet 10; and in the negative functional state, to command the hub assembly 11 to restrict rotation the bicycle wheel 14 beyond a predetermined (e.g., limited) range of movement. In the negative functional state, the safety helmet 10 is presumed to be improperly worn by the user due to, for example, faulty placement and/or adjustment on the head; and/or the helmet 10 being inadequately secured to the head. In the positive functional state, the safety helmet 10 is presumed to be properly applied to the head of the user. In this case, the bicycle wheel 14 rotates in a normal, unobstructed manner.

Rotation-Control Hub Assembly 11

Figure 2:
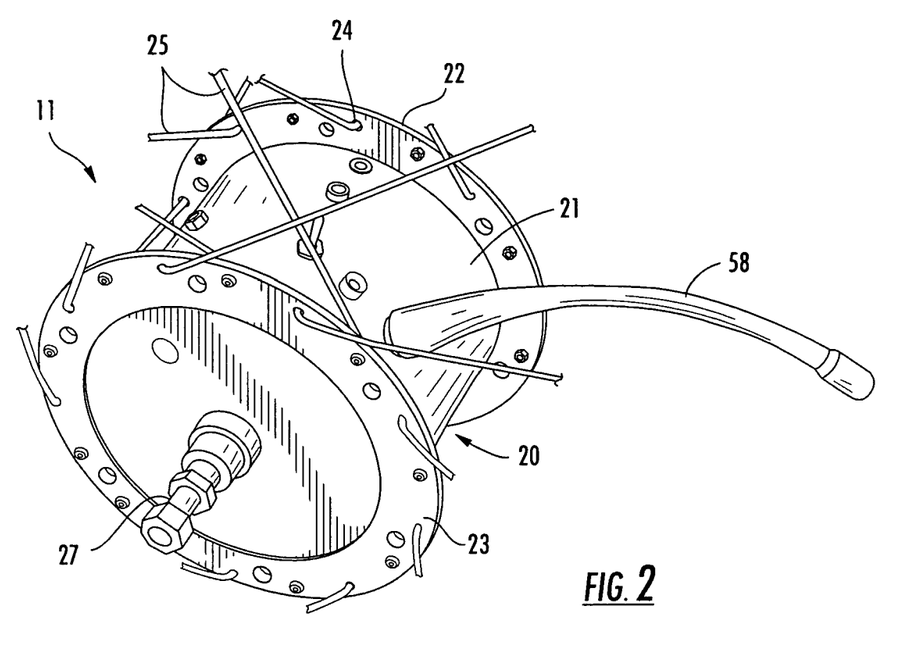
FIG. 2 is a perspective view of the rotation-control hub assembly.
Figure 3:
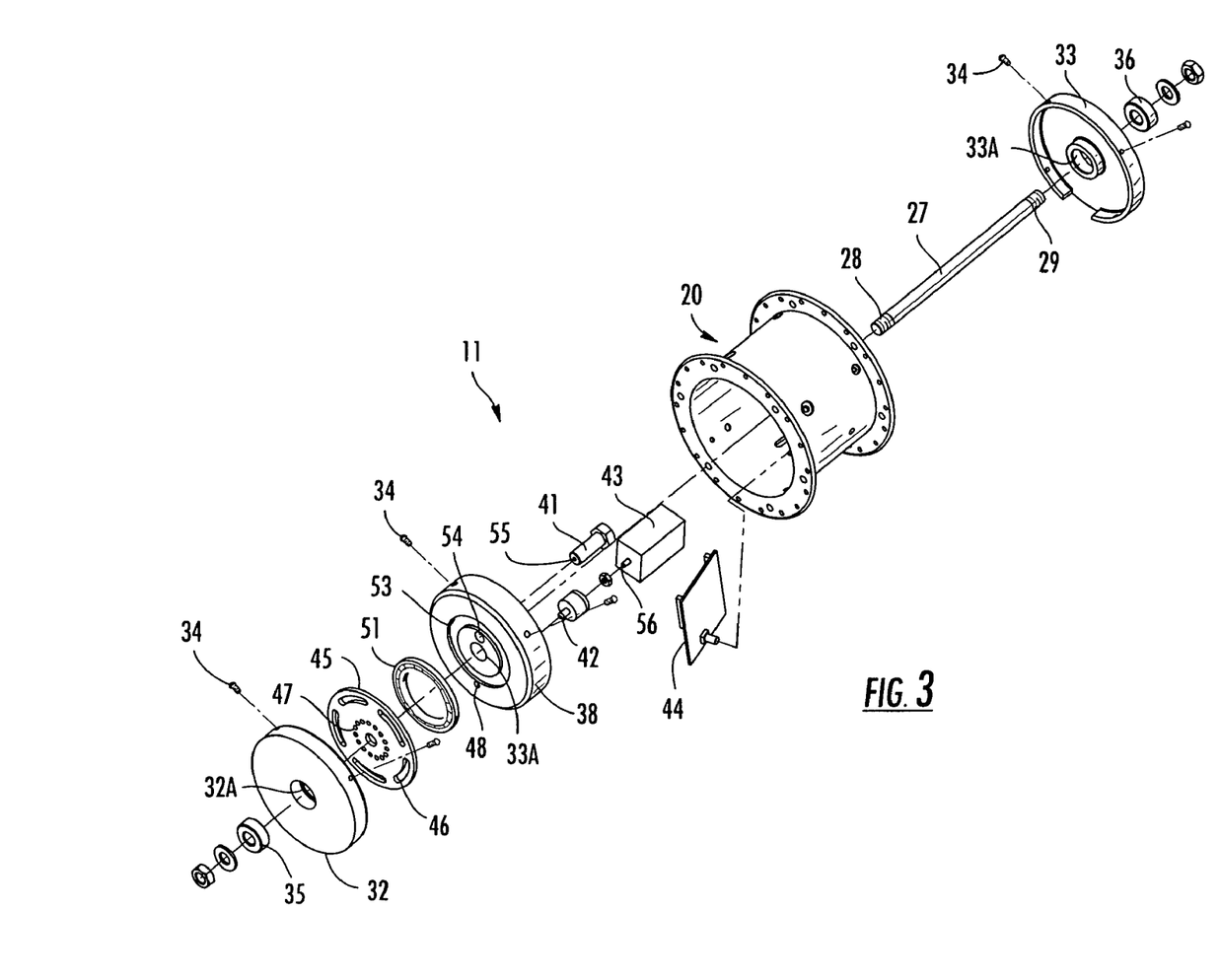
FIG. 3 is an exploded view of the rotation-control hub assembly.
Figure 4:
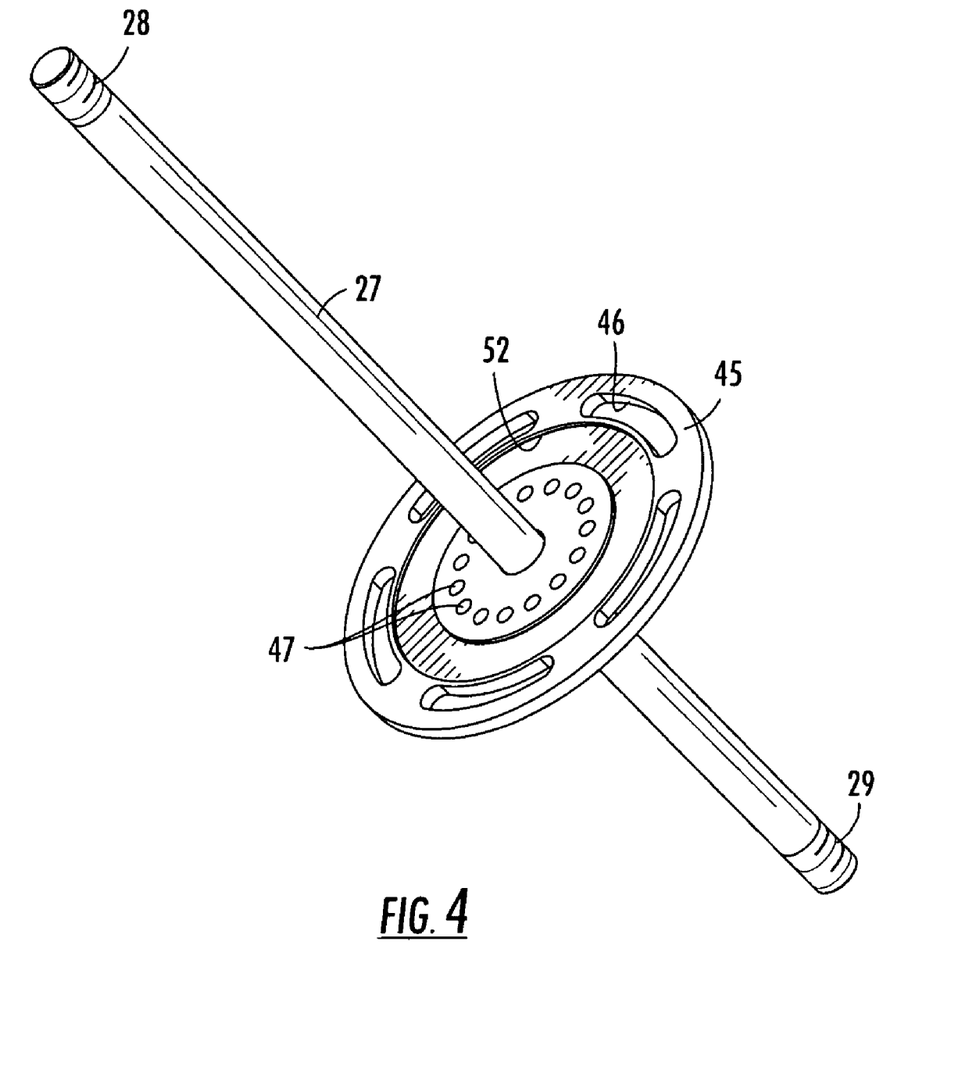
FIG. 4 is a perspective view of the wheel axle and permanently affixed axle disk.

Referring to FIGS. 2, 3, and 4, the rotation-control hub assembly 11 includes a hollow metal housing 20 comprising a cylindrical barrel 21 and opposing outward-extending annular flanges 22, 23 permanently affixed to the barrel 21 (e.g., by welding). As best shown in FIG. 2, the annular flanges 22, 23 define a number of circumferentially-spaced spoke holes 24 for receiving respective bicycle spokes 25. The bicycle spokes 25 permanently attach to the flanges 22, 23 and radiate from the hub assembly 11 to the rim of the bicycle wheel 14. The internal components of the hub assembly 11, described below, are carried on an elongated metal wheel axle 27. The wheel axle 27 has opposing threaded ends 28, 29 which cooperate with hardware in a conventional manner to releasably secure the wheel 14 and integrally-joined hub assembly 11 to a front fork 31 of the bicycle 14 (See FIG. 1).

As best shown in FIG. 3, internal components of the hub assembly 11 are contained inside the housing 20 between opposing annular metal end caps 32 and 33. The end caps 32, 33 are attached to the outer housing 20 adjacent its respective open ends using appropriate hardware, such as screws 34, and define respective centrally-formed openings 32A, 33A for receiving the wheel axle 27. Ball bearings 35, 36 may be located at the openings 32A, 33A of each end cap 32, 33 to facilitate rotation of the hub assembly 11 on the wheel axle 27. Suitable hardware, such as nuts and washers, secure the hub assembly 11 to the wheel axle 27. A metal electronics cup 38 is located between the end caps 32, 33, and is likewise attached to the outer housing 20 using hardware (e.g., screws 34). The electronics cup 38 defines a centrally-formed opening 38A for receiving the wheel axle 27, and a relatively shallow recess on its open side for housing various electronic and mechanical components, such motion sensor 41, locking pin 42, solenoid 43, and circuit board 44. A perforated, non-rotating, metal axle disk 45, shown in FIGS. 3 and 4, is permanently affixed to the wheel axle 27 (although separated for illustration purposes in FIG. 3), and resides between the end cap 32 and a closed side of the electronics cup 38. As best shown in FIG. 4, the axle disk 45 defines a generally circular arrangement of circumferentially-spaced arcuate slots 46, and an inner circular pattern of spaced holes 47—the arcuate slots 46 and holes 47 being formed around a common center defined by the wheel axle 27. The locking pin 42 extends through a pin hole 48 formed in the electrics cup 38, and in a normal condition (See FIG. 7) extends outwardly from the closed side of the cup 38 into a selected one of the arcuate slots 46 formed with the axle disk 45. In its normal condition, the locking pin 42 engages the axle disk 45 upon attempted rotation of the bicycle wheel 14, thereby restricting the wheel's range of motion. In this embodiment, the limited range of wheel motion is defined by the length of the arcuate slot 46. The locking pin 42 is movable (i.e., retractable) by the solenoid 43 to a wheel-releasing position (See FIG. 8) in a positive functional state of the safety helmet 10, as described below, to allow free rotation of the bicycle wheel 14. To facilitate rotation of the bicycle wheel 14 and integrally-joined hub assembly 11 relative to the wheel axle 27 and affixed axle disk 45, a bearing ring 51 (e.g., thrust bearing) may be located between the axle disk 45 and electronics cup 38, and may reside within respective corresponding annular recesses 52 and 53 formed, respectively, with the axle disk 45 and the closed side of the electronics cup 38.

Figure 8:
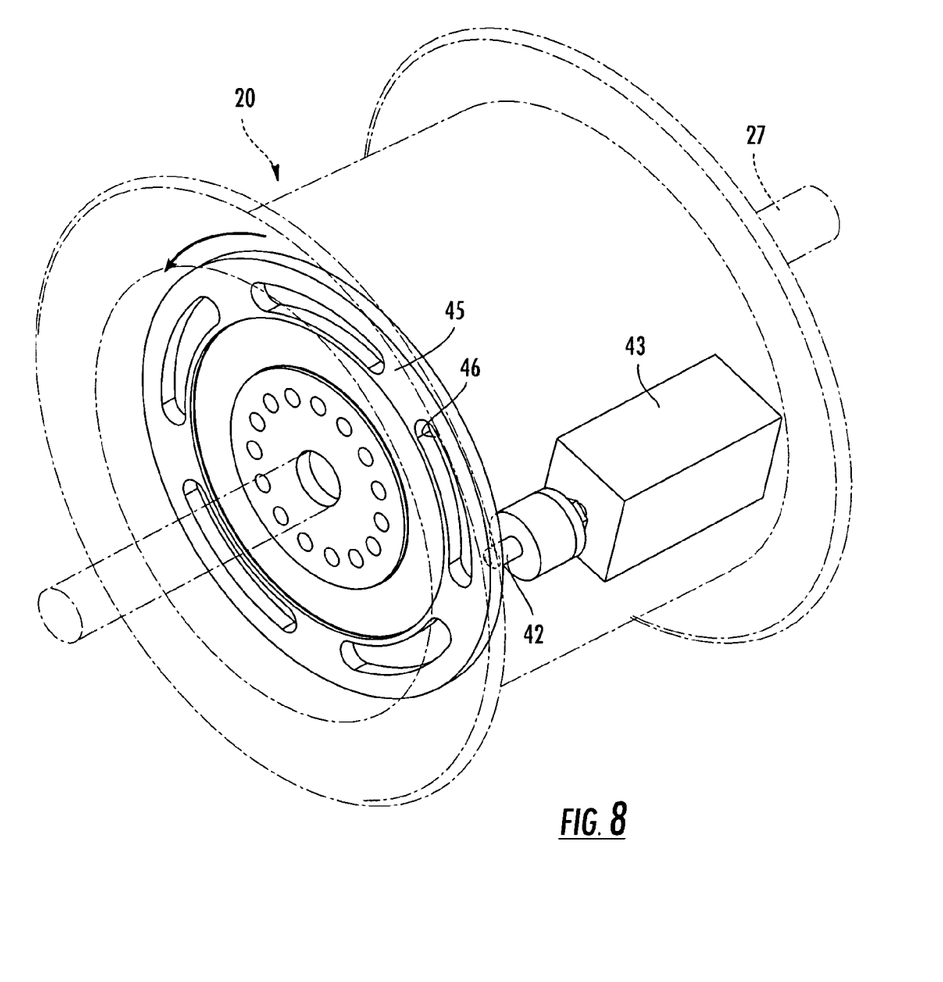
FIG. 8 is perspective view of the rotation-control hub assembly with the locking pin in the wheel-releasing position outside of the arcuate slot of the axle disk.
Figure 9:
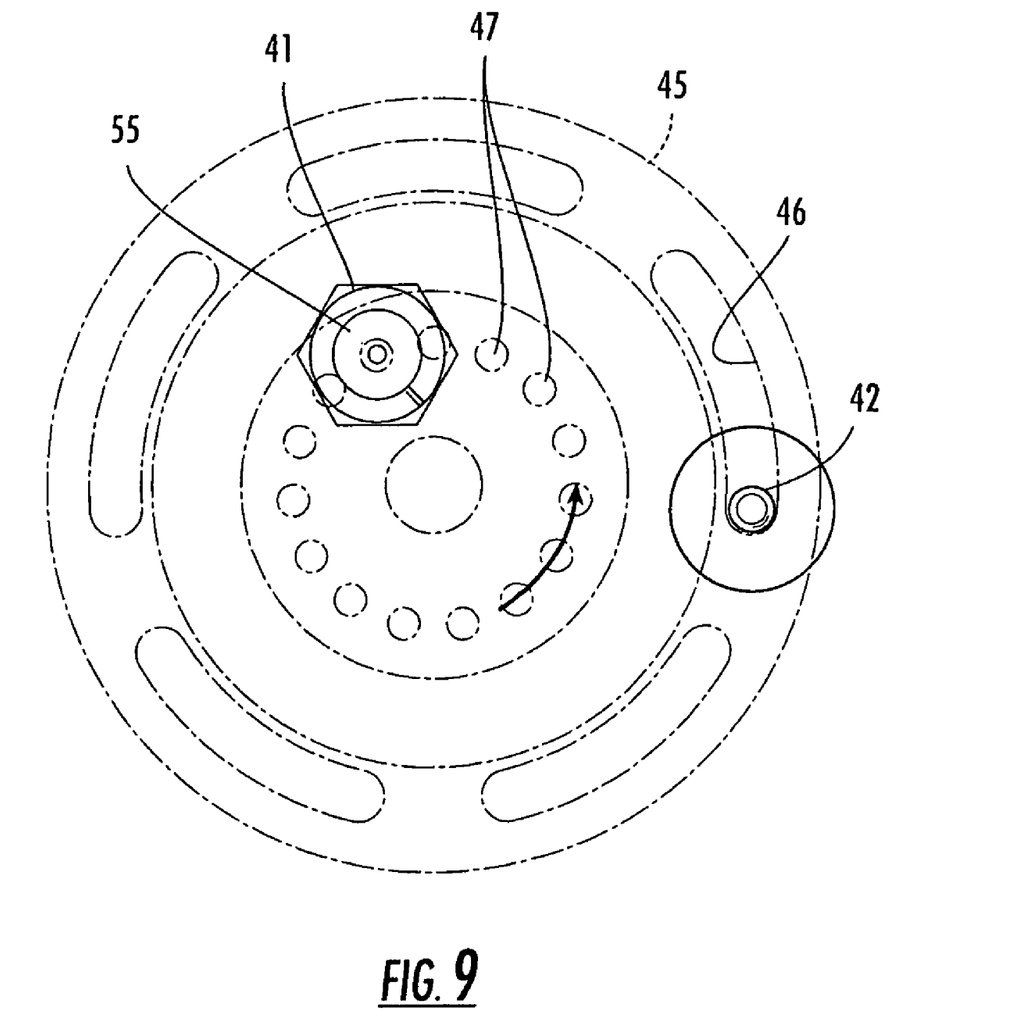
FIG. 9 is an end view of the hub assembly illustrating the motion sensor and locking pin relative to the axle disk of the wheel axle.

The motion sensor 41 extends through opening 54 formed with electronics cup 38, and utilizes a magnet 55 to sense rotation of the bicycle wheel 14 and integrally-joined hub assembly 11 relative to the fixed axle disk 45 of the wheel axle 27. Upon free rotation of the bicycle wheel 14, the magnet 55 operatively disengages the steel axle disk 45, and closes a circuit which energizes the solenoid 43 causing the iron plunger 56 and attached locking pin 42 to pull-in. As long as the bicycle wheel 14 continues to rotate, the energized solenoid 43 retains the locking pin 42 in the wheel-releasing position shown in FIG. 8. When wheel rotation stops (or slows to a threshold degree), the magnet 55 engages the steel axle disk 45 and opens the circuit, thereby disabling further command of the solenoid 43. In this exemplary embodiment, the magnet 55 is aligned with the circular arrangement of holes 47 formed with the axle disk 45, as best shown in FIG. 9.

The solenoid 43 may comprise, for example, a conventional latching (bi-stable, keep, or self-holding) solenoid. As is generally known and understood by those in the art, the latching solenoid exhibits magnetic attraction between the moving iron plunger 56 and a fixed iron component with no electrical power applied. This is done by incorporating permanent magnetic blocks in the magnetic circuit that drive magnetic flux around the iron path. The solenoid 43 is driven with short pulses of current, and when energized, causes the iron plunger 56 to pull-in thereby pulling the locking pin 42 away from its normally extended position inside a selected one of the arcuate slots 46 formed with the axle disk 45. Operation of the solenoid 43 and locking pin 42 are described further below.

The circuit board 44 resides inside the electronics cup 38 adjacent the solenoid 43, and in one exemplary embodiment comprises a single-chip 300-1000 MHz CMOS RF transceiver and microcontroller IC, such as that sold commercially by Chipcon AS of Oslo, Norway under the trademark SmartRF® CC1010. This exemplary IC is integrated on a single die with an industry standard 8051 microcontroller core including on-chip flash non-volatile memory. Data memory for the controller is provided on-chip via two blocks of SRAM (128 byte and 2 kByte). The CC1010 has 32 kByte of on-chip, in-system, self programmable, nonvolatile flash program memory. Additional features may include, for example, a three-channel 10-bit analog to digital converter (ADC), real-time clock (RTC) with 32 kHz crystal oscillator, programmable watchdog timer (WDT), two 8051 timers and two timers/PWM, two programmable serial UARTs, master SPI interface and 26 configurable general I/O-pins. The supply voltage of CC1010 is 2.7 to 3.6 V, and the chip is provided with on-chip power-on-reset (POR) and brown-out circuitry. A whip (monopole) antenna 58, shown in FIG. 2, connects to the circuit board 44, and extends outward from the hub assembly 11. The electronic components of the hub assembly 11 cooperate with corresponding components of the safety helmet 10, as described below, to restrict rotational movement of the front wheel 14.

Safety Helmet 10

Referring to FIGS. 5A, 5B, 6A, and 6B, the safety helmet 10 may resemble a standard ventilated bicycle helmet secured to the head of the wearer in a conventional manner using, for example, pairs of converging side straps 61A, 61B (only one pair shown), chin straps 62, 63, and male and female buckles 64, 65 attached to respective chin straps 62, 63. In one embodiment, the safety helmet 10 comprises a hard plastic shell 71, an interior expanded polystyrene (EPS) liner 72 adjacent the shell 71, and one or more strategically located interior fit pads 74. The fit pads 74 may be attached to the interior foam liner 72 using a suitable adhesive, and may have any desired thickness. The fit pads 74 are commonly located at the interior front, rear, and/or sides of the of the helmet 10.

According to industry recommendations, the safety helmet 10 should sit level on the head with only a couple of finger-widths between eyebrow and the helmet brim. The buckled chin straps 62, 63 should sit at the back of the lower jaw, against the throat, and should be sufficiently tight that the helmet 10 does not move on the head. The V of the side straps 61A, 61B should meet just below the ear with no slack.

In addition to standard components, the safety helmet 10 incorporates a circuit board 80 comprising, for example, a single-chip 300-1000 MHz CMOS RF transceiver and microcontroller IC, such as that previously described. As shown in FIG. 6A, a first pair of electric contacts 81, 82 are located on the male and female buckles 64, 65. A second pair of contacts 83, 84, shown in FIGS. 5A and 5B, may also be located on the interior of the helmet 10 between one or more of the fitting pads 74 and foam liner 72. Wires "W" extend from the contacts 81, 82 and 83, 84 to the circuit board 80. The contacts 81, 82 on the male and female buckles 64, 65 are designed to operatively engage upon proper connection (buckling) of the chin straps 62, 63, thereby closing a first electric circuit. Contacts 83, 84 on the interior of the helmet 10 operatively engage when the fitting pad 74 is urged against the foam liner 72, thereby closing a second electric circuit. A monopole antenna 75, such as that included in the bicycle hub assembly 11, connects to the board 80, and extends outward from the safety helmet 10.

Operation of Personal Safety System

Figure 5A:
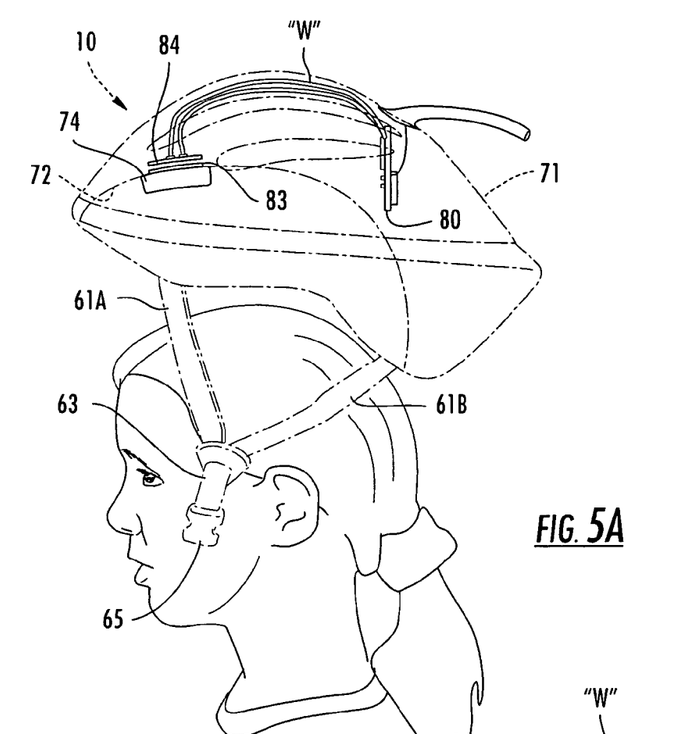
FIG. 5A is a view demonstration application of the safety helmet to the head of the user.
Figure 5B:
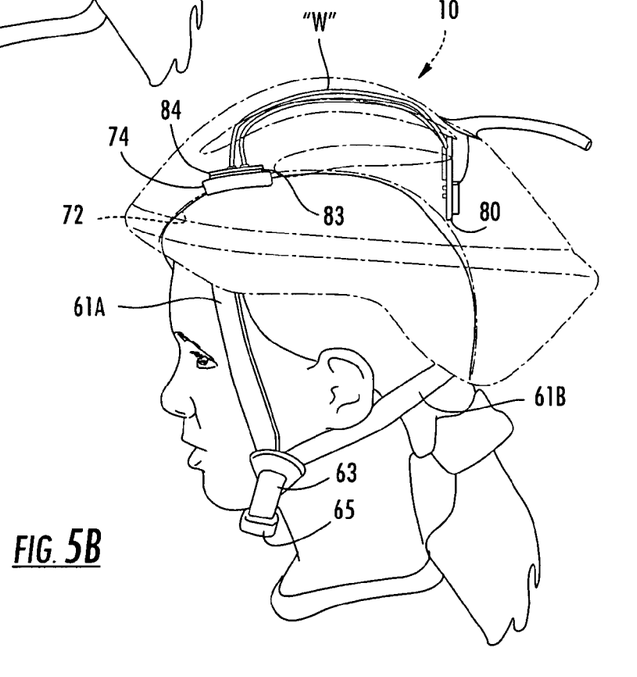
FIG. 5B is a view showing the safety helmet applied to the head of the user in a positive functional state.
Figure 6A:
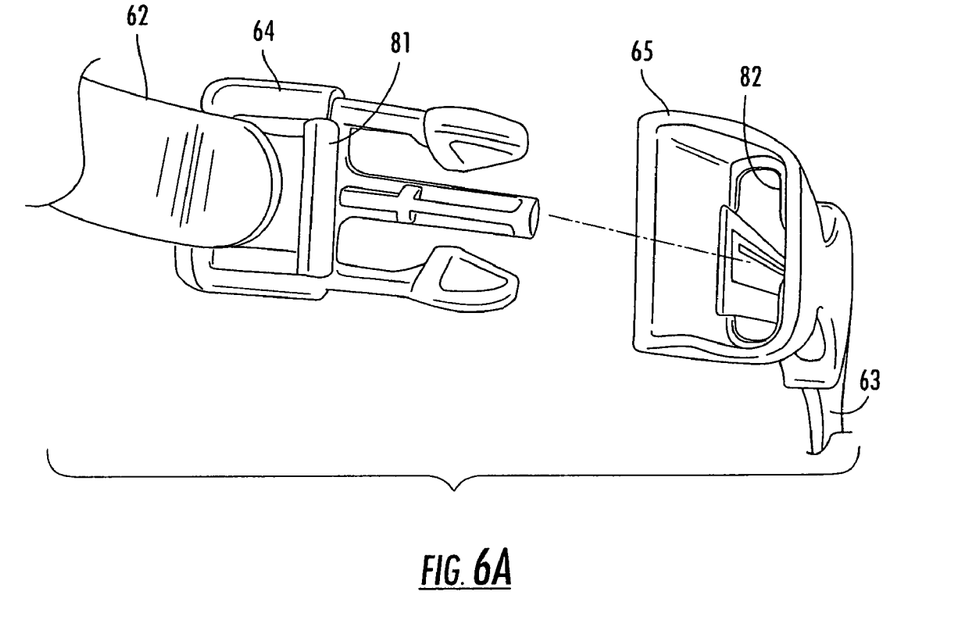
FIG. 6A is a view demonstrating attachment of the male and female buckles of the helmet chin straps.
Figure 6B:
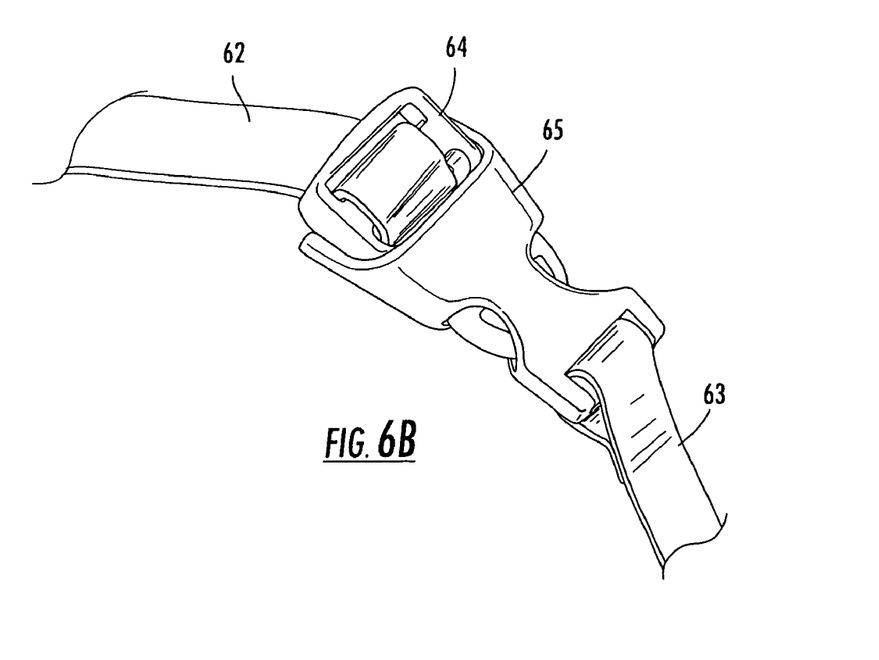
FIG. 6B is a view showing the buckled chin straps in a positive functional state.

Before mounting the bicycle 12, the user applies the safety helmet 10 to the head, as demonstrated in FIGS. 5A and 5B, and then buckles the chin straps 62, 63 by inserting the male buckle 64 into the female buckle 65, as demonstrated in FIGS. 6A and 6B. In this condition, the electric contacts 81, 82 and 83, 84 located on the male and female buckles 64, 65 and on the interior of the helmet 10 operatively engage and close respective first and second electric circuits signally a positive functional state of the safety helmet 10. In this state, the safety helmet 10 is presumed to be properly applied to the head of the user. The positive functional state is communicated by the board-mounted RF transceiver of the safety helmet 10 to the hub control assembly 11 integrally-joined to the bicycle wheel 14. Upon receiving this signal, the solenoid 43 in the hub assembly 11 is energized causing the iron plunger 56 to pull-in and the attached locking pin 42 to move away from the arcuate slot 46 of the axle disk 45 to the wheel-releasing position shown in FIG. 8. With the locking pin 42 in this position, the bicycle 12 operates in a normal manner with the wheel 14 being freely rotatable. Normal operation of the bicycle 12 continues (whether the bicycle is stopped or moving) for as long as the safety helmet 10 is worn by the user in the positive functional state—i.e., with both the first and second circuits closed.

Figure 7:
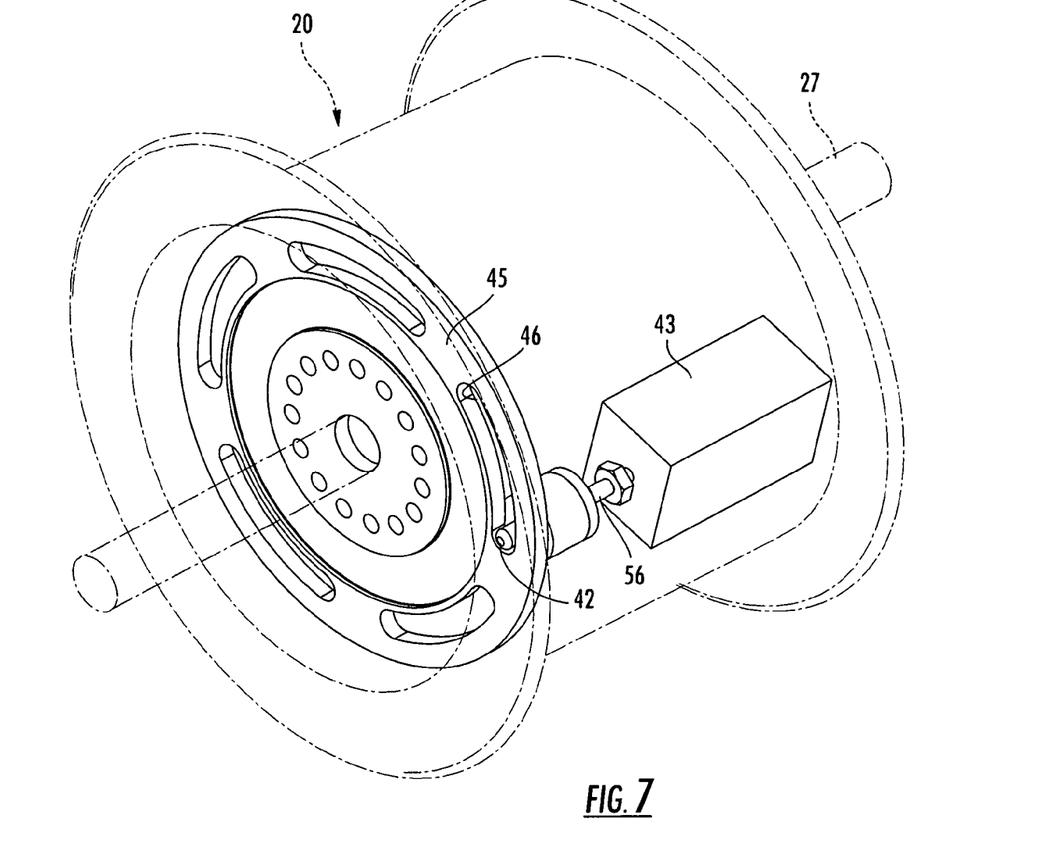
FIG. 7 is perspective view of the rotation-control hub assembly with the locking pin in the wheel-locking position inside an arcuate slot of the axle disk.

When the bicycle 12 is stopped and the safety helmet 10 unbuckled, the electric contacts 81, 82 at the male and female buckles 64, 65 disengage and open the first electric circuit. This signals a negative functional state of the safety helmet 10. In the state, the safety helmet 10 is presumed to be improperly applied or inadequately secured to the head of the user. The board-mounted RF transceiver in the helmet 10 communicates this state to the hub assembly 11. When the signal is received, the solenoid 43 is de-energized causing the iron plunger 56 and locking pin 42 to return to their normal, extended position. As shown in FIG. 7, the locking pin 42 re-locates inside a selected one of the arcuate slots 46 formed with the axle disk 45. In this wheel-locking position, the locking pin 42 allows only a slight predetermined range of movement of the bicycle wheel 14—this range being defined by the length of the arcuate slot 46. The same effect, described above, occurs if the bicycle 12 is stopped and the electric contacts 83, 84 on the inside the safety helmet 10 disengage and open the second circuit. As such, a user cannot avoid the present safety system by simply removing his/her helmet 10 and buckling the chin straps 62, 63. The board-mounted RF transceivers in the safety helmet 10 and wheel hub assembly 11 may have a range of 5-10 feet, and may be uniquely coded such that only certain helmets and bicycles can function together.

In the event the chin straps 62, 63 of the safety helmet 10 become unbuckled while the bicycle 12 is in motion, the first circuit opens and the RF transceiver signals to the hub assembly 11 a negative functional state of the helmet 10, as previously described. However, because the bicycle wheel 14 is rotating, the motion sensor 41 creates a closed circuit causing the solenoid 43 to remain energized, thereby retaining the locking pin 42 in the wheel-releasing position for as long as the bicycle wheel 14 continues to freely rotate. When wheel rotation stops, the magnet 55 of the motion sensor 41 operatively engages the axle disk 45 and opens the circuit, thereby disabling further command of the solenoid 43 and causing the locking pin 42 to return into the wheel-locking position. This same effect occurs if the safety helmet 10 remains buckled but is removed from the head while the bicycle 12 is in motion.

Exemplary embodiments of the present invention are described above. No element, act, or instruction used in this description should be construed as important, necessary, critical, or essential to the invention unless explicitly described as such. Although only a view of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. A personal safety system for a user of a vehicle, said safety system comprising:
   body-protective gear adapted for wear by the user of the vehicle;
   means for determining a positive or negative functional state of said body-protective gear; whereby in the positive functional state, said body-protective gear is presumed to be properly applied to a body part of the user, and in the negative functional state, said body-protective gear is presumed to be improperly applied to the body part of the user;
   means for communicating the functional state of said body-protective gear to the vehicle; and
   means for restricting operation of the vehicle when said body-protective gear is in the negative functional state, said means for restricting comprising a rotation-control hub assembly adapted for attachment to a wheel of the vehicle.

2. A personal safety system according to claim 1, wherein said means for determining a functional state of said body-protective gear comprises an electric circuit with contacts located on said body-protective gear.

3. A personal safety system according to claim 1, wherein said means for communicating the functional state of said body-protective gear comprises a transceiver carried by said body-protective gear.

4. A personal safety system according to claim 1, wherein said hub assembly comprises a movable locking pin adapted for selectively locking the wheel of the vehicle against rotational movement.

5. A personal safety system according to claim 4, wherein said hub assembly comprises means for actuating said locking pin between a wheel-releasing position and a wheel-locking position.

6. A personal safety system according to claim 5, wherein said means for actuating said locking pin comprises a solenoid.

7. In combination with a vehicle, a personal safety system comprising:
- body-protective gear adapted for wear by a user of said vehicle;
- means for determining a positive or negative functional state of said body-protective gear; whereby in the positive functional state, said body-protective gear is presumed to be properly applied to a body part of the user, and in the negative functional state, said body-protective gear is presumed to be improperly applied to the body part of the user;
- means for communicating the functional state of the body-protective gear to the vehicle; and
- means for restricting operation of the vehicle when said body-protective gear is in the negative functional state, said means for restricting comprising a rotation-control hub assembly attached to a wheel of said vehicle.

8. A combination according to claim 7, wherein said means for determining a functional state of said body-protective gear comprises an electric circuit with contacts located on said body-protective gear, and adapted for closing in the positive functional state of said gear on the body part of the user.

9. A combination according to claim 7, wherein said vehicle comprises a manually-propelled bicycle.

10. A combination according to claim 7, wherein said body-protective gear comprises a safety helmet having first and second attachment straps, and cooperating male and female buckles located at respective free ends of said attachment straps and adapted for releasably mating to buckle said attachment straps.

11. A combination according to claim 10, wherein said means for determining a functional state of said body-protective gear comprises an electric circuit with contacts located on the male and female buckles of said attachment straps, and adapted for closing upon insertion of the male buckle into the female buckle.

12. A combination according to claim 10, wherein said means for determining a functional state of said body-protective gear comprises an electric circuit with contacts located on an interior of said safety helmet, and adapted for closing in the positive functional state of said helmet on the head of the user.

13. A combination according to claim 7, wherein said means for communicating the functional state of said body-protective gear comprises a transceiver carried by said body-protective gear.

14. A combination according to claim 7, wherein said hub assembly comprises a movable locking pin adapted for selectively locking the wheel of said vehicle against rotational movement.

15. A combination according to claim 14, wherein said hub assembly comprises means for actuating said locking pin between a wheel-releasing position and a wheel-locking position.

16. A combination according to claim 15, wherein said means for actuating said locking pin comprises a solenoid.

17. A combination according to claim 16, and comprising means for sensing rotational movement of said vehicle wheel, and said means communicating with said solenoid to block actuation of said locking pin into the wheel-locking position upon rotational movement of said vehicle wheel.

* * * * *